United States Patent
Chaiet et al.

[15] 3,652,401
[45] Mar. 28, 1972

[54] PURIFICATION OF DEXTRANASE USING IRON SALTS

[72] Inventors: Louis Chaiet, Springfield; August J. Kempf, Stanton Island, both of N.Y.

[73] Assignee: Merck & Co., Inc., Rahway, N.J.

[22] Filed: Nov. 7, 1968

[21] Appl. No.: 774,215

[52] U.S. Cl. .................................195/66 R, 424/50, 424/94
[51] Int. Cl. .........................................................C07g 7/02
[58] Field of Search.............................195/31, 62, 63, 66, 68

[56] References Cited

UNITED STATES PATENTS

| | | | |
|---|---|---|---|
| 2,716,237 | 8/1955 | Carlson et al. | 195/31 |
| 2,922,745 | 1/1960 | Singher et al. | 195/62 |
| 3,380,892 | 4/1968 | Garbutt | 195/31 |
| 689,149 | 12/1901 | Weber | 195/62 |

OTHER PUBLICATIONS

Colomick, et al., Methods of Enzymology, Academic Press, N.Y., Vol. 5, 1962, (p. 12– 13)

Dixon, et al., Enzymes, Academic Press Inc., N.Y., 1964 (p. 44 & 46)

*Primary Examiner*—Lionel M. Shapiro
*Assistant Examiner*—D. M. Naff
*Attorney*—Raymond Underwood, Harry E. Westlake, Jr. and I. Louis Wolk

[57] ABSTRACT

Ferric chloride is added to crude dextranase containing solutions to selectively form a complex with the dextranase by adjustment of the pH, to thereby recover purified dextranase.

4 Claims, No Drawings

3,652,401

PURIFICATION OF DEXTRANASE USING IRON SALTS

CROSS-REFERENCES TO RELATED APPLICATIONS

This application is related to applications Ser. Nos. 771,600 and 771,655, both filed Oct. 29, 1968, and both now abandoned.

This invention relates to processes for obtaining the enzyme known as dextranase and particularly to procedures for recovering it in a purified state.

Dextranase has been found to be highly useful on application to the teeth and gums to prevent the formation of plaque and to also bring about its removal. The effectiveness has been reported in the journal article entitled, "The Effects of a Dextranase Preparation on Plaque and Caries in Hamsters, a Preliminary Report" by R.J. Fitzgerald et al., J. Am. Dental Assn. 76 No. 2, pp 301–304, Feb. 1968. For this reason it has been proposed that dextranase be added to conventional tooth powders, toothpastes and mouthwashes, for instance to serve both as a prophylactic and as a therapeutic agent against dental plaque and eventual caries.

The best present source of dextranase is its formation by bacteria and fungi when they are growing in a synthetic culture medium. The dextranase is elaborated as an extra-cellular product and consequently it must be separated from the ingredients of the culture medium, from the other substances created in the culture medium due to the growth process and from the cells themselves. As the dextranase is produced in rather minute quantities, its recovery in purified form requires its careful removal from the contaminants in the culture medium.

The growth of the selected dextranase producing organism in a selected synthetic culture medium is well known. A suitable organism is Penicillium funiculosum as it produces a relatively high yield of dextranase, but other known organisms may be used as well. A suitable culture medium is that disclosed in Table I in an article entitled "An Antiviral Substance from Penicillium Funiculosum" by R.E. Shope, J. Exp. Med, 97, p. 601, 1966. The culture medium may also be that disclosed by U.J. Lemis et al., J. Am. Chem. Soc., 82, p. 5178, (1960), but other known culture media may be used.

The feature of the invention is the discovery that ferric salts such as ferric chloride selectively form a water insoluble complex with dextranase within a set pH range. To carry out the invention, ferric chloride, for example, is added to aqueous preparations containing dextranase and impurities so that the ferric-dextranase complex which is formed will precipitate and its separation and recovery is thereby facilitated. This is so selective that dextranase when present in as low an amount as about 1 microgram per ml. of the solution will become complexed on the addition of as little as 0.7 mg. of the ferric ion per ml. of the solution.

The ferric ion becomes complexed with the dextranase in crude as well as partially purified suspensions and this occurs most effectively at pH 5 although a pH of 4.5 to 5.5. is satisfactory. Below pH 4.5 the ferric ion preferentially complexes with other proteins which may be present with the dextranase and this makes it possible to carry out an iron pretreatment step to obtain a relatively purified dextranase.

The iron complexing treatment may for instance, be applied directly to the fermentation broth to cause the precipitation of dextranase, thus leaving some impurities in solution. To do this the ferric chloride is added to the fermentation broth and adjustment is then made to a pH of about 3.0. Below pH 3 the dextranase is somewhat unstable. The ferric-protein complex is readily removed by filtration, centrifugation or even decanting and the remaining solution will be found to be low in dextranase activity.

As stated above, the ferric-dextranase complex is best formed at a pH 4.5–5.5 (except for a fermentation broth which is carried out at pH 3) and this may be carried out on the solution remaining after the iron pretreatment mentioned above or it may be performed on another partially purified dextranase solution obtained from the fermentation broth. Such other partially purified preparation, for instance, may be that obtained by the known use of preliminary concentration or ammonium sulfate precipitation upon the fermentation broth.

The iron-dextranase complex is readily recovered by filtration, centrifugation or decanting and the dextranase is released from the complex by adding a substantially neutral electrolyte solution. This is best accomplished with a phosphate buffer of about pH 7 and this salt is then removed from the highly purified dextranase by dialysis or gel filtration. For gel filtration a suitable desalting agent is a body of a series of porous polyacrylamide gels with closely controlled pore sizes such as Bio Gel P-6. The resulting salt free product is highly purified dextranase.

The following examples are illustrative of the invention. The dextranase assay is based on the hydrolysis of a linear dextran and precipitation of the unhydrolyzed dextran with alcohol. Pure dextranase is indicated to be 43,000 units per mg. of dried solids. Dextranase has a U.V. maximum at 280 m$\mu$ and a U.V. minimum at 250 m$\mu$ with an $E_J$ at 280 m$\mu$ of about 20. The U.V. at 280 m$\mu$ is an indication of the weight of protein in solution and the dextranase hydrolysis units per optical density (O.D.) unit is indicative of the purity of a sample (pure dextranase=21,500 units/O.D.

EXAMPLE 1

Iron Pretreatment Method

Five liters of dextranase isolate containing 80,000 dextranase units per ml. and a potency of 3,800 units per mg. of dried solids was treated with 90 ml. of ferric chloride solution (10.6 g, $FeCl_3$/280 ml. water). The pH dropped to pH 3.3 and was adjusted to pH 4.4 with caustic. The slurry was centrifuged and the centrifugate (A) contained all the dextranase but the solids dropped 2.3 fold to give a potency of 8,600 units per mg. of solids.

EXAMPLE 2

Iron Precipitation Method

Two hundred ml. of iron filtrate (A) from Example 1 at 5,000 dextranase units per O.D. unit was treated with 8 ml. of the above ferric chloride solution, adjusted to pH 5 and filtered. The filtrate (B) contained 57 percent of the starting dextranase at a potency of 8,000 units per O.D. unit. The iron precipitate was slurried in 25 ml. of water at pH 7 but only one percent of the dextranase was solubilized. However, when 3 ml. of 1M pH 7 phosphate buffer was added, 20 percent of the dextranase was solubilized.

Another 6 ml. of ferric chloride solution was added to filtrate (B), adjusted to a final pH 5 and filtered. The filtrate (C) contained only 3 percent of the original dextranase. The iron precipitate was treated with 25 ml. of water plus 3.5 ml. of 1M pH 7 phosphate buffer and centrifuged to yield a clear solution containing 4,000,000 units at a potency of 15,800 dextranase units per O.D. unit. The solution was desalted via Bio-Gel P-10 to give a solution containing 35,000 dextranase units per mg. of dried solids.

EXAMPLE 3

Iron Pretreatment, Iron Precipitation

Two liters of dextranase isolate Batch No. 2 (P-6 effluent) containing 187 × $10^6$ dextranase units (at a purity of 1840 dextranase units per O.D. unit) was adjusted to pH 7. Sixty ml. of ferric chloride solution was added until a pH 3.4 was reached. The precipitate was filtered off and washed with water to give a filtrate (A) containing 140 × $10^6$ units (purity = 2670 units/O.D.)

Sixty ml. of ferric chloride solution was added to filtrate (A) between pH 7 and 4 with a final pH 5 and the slurry was filtered. The filtrate (B) contained 136 × $10^6$ units (purity = 9700 units/O.D.).

Another 60 ml. of ferric chloride solution was added to filtrate (B) with a final pH 5 and filtered. The filtrate (C) contained only 1.4 × 10⁶ units. The last iron precipitate was extracted three times 100 ml. of 0.2M pH 7 phosphate buffer. The extracts were combined and evaporated to 30 ml. The concentrate was desalted via a 250 ml. Bio Gel P–10 column. The salt-free highly active fractions contained 32 × 10⁶ dextranase units (potency = 14,000 units/O.D.; 30,000 units/mg solids).

EXAMPLE 4

Effect of pH on Iron Complexing of Dextranase in Fermentation Broth

Five ml. of fermentation broth PP 16,359 and 16,360 (assay = 640 units per ml. was put in each of six centrifuge tubes with 0.2 ml. of ferric chloride solution (containing 2.2 mg. ferric ion). The pH of the tubes were adjusted to: pH 3, 4, 5, 6, 7, 8. The tubes were shaken for one-half hour and centrifuged. The clear liquid was assayed and the precipitates were taken up in 5 ml. of 0.2M pH 7 phosphate buffer and assayed.

| pH | units/ml. | yield (%) |
| --- | --- | --- |
| 3 ppt. | 450 | 70 |
| filtrate | 23 | 4 |
| 4 ppt. | 363 | 57 |
| filtrate | 175 | 27 |
| 5 ppt. | 245 | 38 |
| filtrate | 238 | 37 |
| 6 ppt. | 73 | 11 |
| filtrate | 363 | 57 |
| 7 ppt. | 23 | 4 |
| filtrate | 369 | 57 |
| 8 ppt. | 30 | 5 |
| filtrate | 338 | 53 |

Two 5 ml. portions of fermentation broth was put in each of two centrifuge tubes, treated with 0.2 ml of iron solution at pH 3 for one-half hour and centrifuged. One precipitate was taken up in 5 ml. 2M phosphate buffer and the second precipitate was taken up in 5 ml. of water. Both slurries were centrifuged and the clear liquor assayed.

| | |
| --- | --- |
| pH 7 phosphate buffer takeup | – 519 units = 81% yield |
| water takeup (pH 7) | – 450 units = 70% yield |

EXAMPLE 5

Effect of Salt on Iron Complexing of Dextranase

A 10 ml. portion of purified salt-free dextranase solution at a concentration of 17,800 units per ml. (U.V. at 280 m$\mu$ = 1.83) was treated with 1 ml. of ferric chloride solution (11 mg. ferric ion per ml.) and adjusted to pH 5, stirred for 15 minutes and centrifuged. Three more 10 ml. portions were treated identically except 110 mg, 330 mg and 990 mg of sodium chloride were added prior to the iron treatment.

The filtrates of all the above treatments were assayed and U.V. observed. The results are shown below.

| NaCl added | | Filtrate assay | Filtrate U.V. at 280 m$\mu$ |
| --- | --- | --- | --- |
| 1. 0 mg. | (0%) | 960 units/ml. | 0.12 Optical Density |
| 2. 110 mg. | (1%) | 5,200 | 0.28 Optical Density |
| 3. 330 mg. | (3%) | 8,800 | 0.44 Optical Density |
| 4. 990 mg. | (9%) | 6,500 | 0.45 Optical Density |

EXAMPLE 6

Effect of pH on Iron Complexing of Dextranase

A purified salt-free solution of dextranase (26 ml.) containing 20,000 units per ml. was treated with 0.6 ml. of ferric chloride solution (11 mg. ferric ion/ml.) and the pH adjusted to pH 7. The mixture was adjusted to: pH 6, pH 5, pH 4 and pH 3 with HCl and aliquots centrifuged at the various pH's. The results are shown below.

| pH | Dextranase in filtrate |
| --- | --- |
| 7 | 11,700 units per ml. |
| 6 | 6,700 |
| 5 | 1,180 |
| 4 | 2,300 |
| 3 | 7,900 |

What is claimed is:

1. The method of recovering purified dextranase from a fermentation broth which comprises the addition of ferric ions and adjustment to a pH below 5 to form a precipitate with the dextranase, recovering the precipitate and releasing the dextranase therefrom by addition of a substantially neutral electrolyte solution, and then desalting the released dextranase.

2. The method according to claim 1 in which the pH is adjusted to about 3.0.

3. The method of recovering purified dextranase from a partially purified dextranase solution which comprises the addition of ferric ions and the pH is adjusted to 4.5 to 5.5 to thereby form a precipitate with the dextranase, recovering the precipitate and releasing the dextranase therefrom by addition of a substantially neutral electrolyte solution, and then desalting the released dextranase.

4. The method of recovering purified dextranase from a crude solution which comprises the addition of ferric ions and a pH adjustment to about 3.0 to 4.4 to selectively complex impurities as precipitates, removing precipitates thus leaving an improved purification of dextranase in solution, then adding ferric ions and adjusting to a pH 4.5 to 5.5 to form a ferric-dextranase complex as a precipitate, recovering the precipitate and releasing the dextranase therefrom by addition of a substantially neutral electrolyte solution, and then desalting the released dextranase.

* * * * *